May 23, 1961 R. W. STATZELL 2,985,306

FLUID FILTER

Filed Sept. 30, 1959

INVENTOR.

ROBERT W. STATZELL

BY

William S Thompson

AGENT 2,985,306
Patented May 23, 1961

2,985,306

FLUID FILTER

Robert W. Statzell, South Bend, Ind., assignor to The Bendix Corporation, a corporation of Delaware Filed Sept. 30, 1959, Ser. No. 843,577
5 Claims. (Cl. 210—130)

The present invention relates to a filter of the type which may be inserted in a fuel supply system particularly of the highly contaminated high flow type which may be encountered, for example, in jet aircraft installations.

It is an object of the present invention to provide a relatively small compact filter for use in filtering large quantities of highly contaminated fluid.

It is another object to provide a filter which can be cleaned without removal of the filtering element from a system installation.

Other objects and advantages of the present invention will become apparent when reference is made to the attached disclosure and accompanying drawings wherein.

Figure 1:
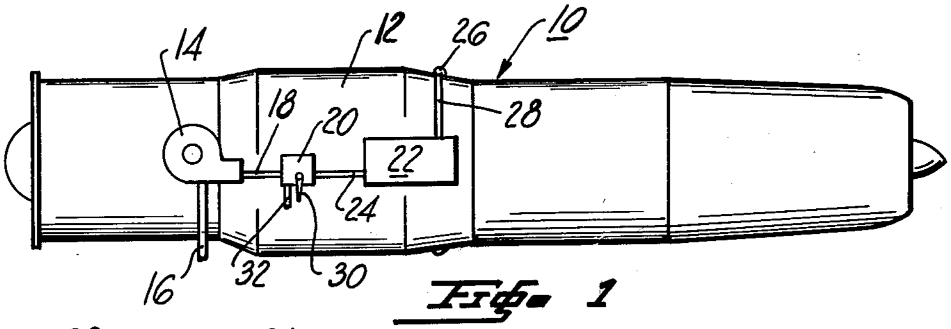
Figure 1 is a schematic block diagram of a fuel supply system which may conveniently utilize the advantages of the present invention.

Referring to Figure 1, there is shown a gas turbine engine generally indicated by numeral 10 having an exterior casing 12. An engine driven pump 14 is mounted on said exterior casing and receives fuel from a source, not shown, by means of a conduit 16. Pressurized fuel from pump 14 is delivered through outlet conduit 18 to fluid filter 20 and from thence to a main fuel control 22 by means of conduit 24. Fuel control 22 is operative to schedule a quantity of fuel delivered to the engine manifold 26 through a fuel control outlet conduit 28. Fluid filter 20 includes a manually positionable lever 30 and an over board drain conduit 32 for purposes to be later described. In an installation of the type shown, it is highly desirable to provide means for cleaning filter 20 without removal from the system inasmuch as control components such as pump 14, filter 20 and control 22 are generally not readily accessible. Further, by providing ready means for cleaning filter 20 enables a filter of reduced size to be used for the reason that it would be always operating with a high percentage of clean filtering surface.

Figure 2:
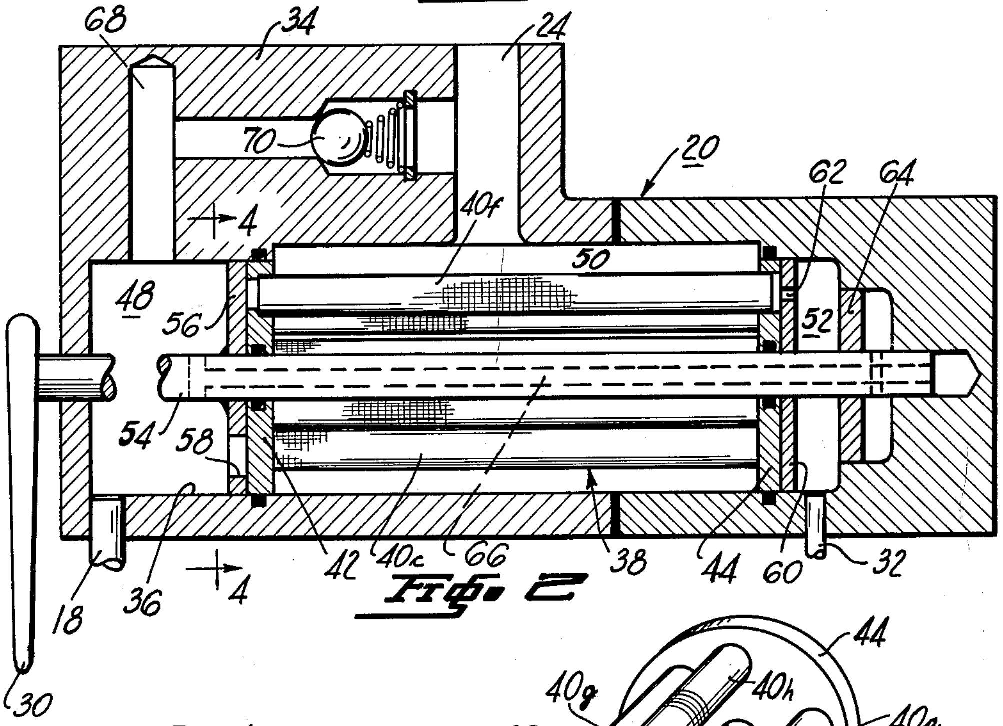
Figure 2 is a section view in detail of a preferred embodiment of my invention.
Figure 4:
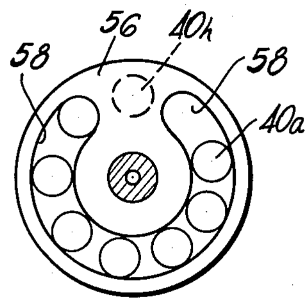
Figure 4 is a section view taken along section 4—4 of Figure 2.
Figure 3:
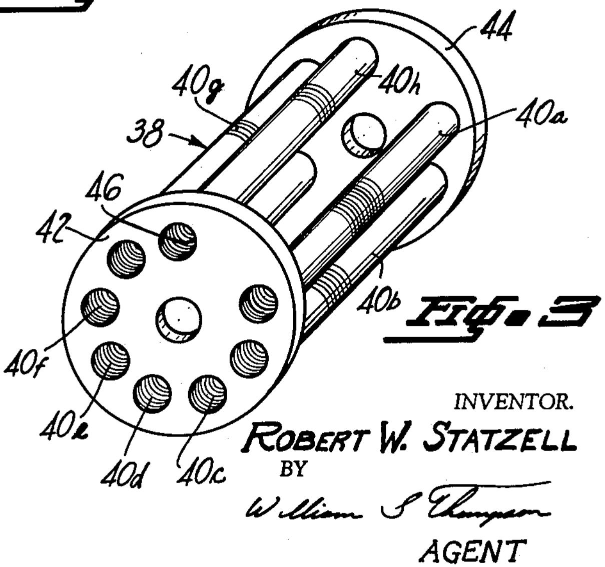
Figure 3 is an isometric view of an arrangement of the filtering elements.

In Figure 2, there is shown in greater detail the fluid filter of the present invention generally indicated at 20 including a housing 34 which forms a longitudinally disposed interior chamber 36, which chamber is connected to the three previously disclosed conduits 18, 24 and 32. A filter cartridge assembly 38, which is best shown in Figure 3, is comprised of a plurality of screen tubular filter elements designated by numeral 40*a* through *h* and a pair of end caps 42 and 44 each secured to opposite ends of said tubular filter elements. Each of said end caps includes a plurality of annularly arranged ports 46 which are operative to provide openings into the interior of said filter elements. Filter cartridge assembly 38 is sealingly disposed in the longitudinal chamber 36 to form a first subcompartment 48, an intermediate subcompartment 50, and a third subcompartment 52. A rotatable shaft member 54 is rotationally supported by housing 34 and extends externally from the left side of said housing to engage the manually positionable lever 30. A first valve plate member 56 is secured to shaft 54 for rotation therewith and includes an annularly formed slot 58 which covers a substantial segmental arc of said valve plate member as best shown in Figure 4. Valve plate member 56 is located flush against the end cap 42 such that the annular slot 58 is operative to selectively control the filter elements to which fluid is to be supplied. A second valve plate member 60 is additionally secured to shaft 54 and rotational therewith and is located flush with the end cap 44. Said second valve plate member 60 includes a singular circular orifice 62 which is designed in size to provide an opening for only one of the filter elements at a time. The valve plate members 56 and 60 are secured rotationally to shaft 54 such that their respective openings 58 and 62 cannot simultaneously provide openings for identical filter elements. A balance piston 64 is additionally secured to shaft 54 at the right end thereof and is supplied fluid from chamber 48 by means of the conduit 66 formed internally in shaft 54 such that the fluid pressure forces acting on the rotatable system comprising shaft 54, valve plate members 56 and 60 may be substantially balanced out. A conduit 68 is formed in housing 34 and interconnects first subcompartment 48 and outlet conduit 24. A spring loaded check valve 70 is arranged in said conduit to permit flow from chamber 48 to conduit 24 when the force supplied by its loading spring is exceeded by the fluid pressure force differential acting thereon.

Fuel from the pump 14 is pressurized and delivered through conduit 18 to the first subcompartment 48 of the fluid filter 20. When the lever 30 is placed in a filter position, the annular slot 58 of the first valve plate member 56 is operative to uncover all of the annularly arranged ports 46 of end cap member 42 thus permitting pressurized fluid to flow into the interior of the screen filter elements 40*a* through *h*. Additionally, the circular orifice 62 of the second valve plate member 60 is maintained in a position intermediate to tubular filter elements 40*a* and 40*h* wherein it communicates with a solid portion of the end cap member 44. Thus unfiltered fuel flows from first intermediate chamber 48 into the interior of all the tubular screen filter elements and passes out through the screen openings in the filter tubes into the downstream flow passage 24. Contamination or foreign material too large to pass through the tube walls is retained on the inside diameter of said filter elements. If after a sufficient period of operation the contaminate build up on the interior of the walls of the filter elements is sufficient to require cleaning, lever 30 may be rotated to selectively cover the opening of any of the filter elements 40*a* through 40*h*, such for example as is shown in Figure 3 wherein the opening of filter element 40*h* is covered. By virtue of the same rotation circular orifice 62 of the second valve plate member 60 communicates with the opposite end of filter element 40*h* to provide an outlet passage. In this position, unfiltered fuel in chamber 48 is permitted to enter filter elements 40*a* through 40*g* by the annular slot 58 and fill chamber 50 with relatively high pressure filtered fuel. A portion of fuel in chamber 50 will flow out of outlet conduit 24, and another portion will provide a reverse flow of fluid through the filtering element 40*h* and out through orifice 62, chamber 52 and dump conduit 32 carrying with it the dirt or contaminate from the inside diameter of the tube 40*h*. It is to be understood, that lever 30 may be selectively positioned to individually flush out the remaining filtering elements 40*a* through 40*g*. If in between filter cleanings the contaminate level of the fuel is so high as to completely plug the filtering elements, the fluid pressure differential acting across check valve 70 and the conduit 68 will rise sufficiently to open said valve and permit the continued supply of fuel to the engine.

Although the instant invention has been shown with a certain degree of particularity, it should be understood that the disclosed embodiment was made by way of example only and that various changes in the form and relative arrangement of parts may be made to suit individual requirements.

I claim:

1. A fluid filter comprising: a container forming an interior elongated chamber; a filter cartridge including first and second end caps each having a plurality of annularly arranged ports and tubular filter elements secured on opposite ends to said end caps at said port locations; said filter cartridge assembly sealingly disposed in said elongated chamber to form first, intermediate and third compartments therein; first and second ported valve plates located flush against said first and second end caps respectively to seal off said tubular filter elements; a rotatable shaft member secured to said first and second ported valve plates and extending externally from said housing; said first and second valve plates having their respective ports arranged to uncover opposite ends of different filter elements; a first conduit supplying unfiltered pressurized fluid to said first compartment; a second conduit connected to said intermediate compartment for transmitting filtered fluid to a remote location for use; and a third conduit conducting fluid away from said third compartment.

2. A fluid filter as claimed in claim 1 including a fluid pressure balance piston secured to said shaft member and communicating with fluid in said third compartment on one side and passage means transmitting pressurized inlet fluid to another side.

3. A fluid filter as claimed in claim 1 including a spring loaded relief valve interconnecting said first and second conduits.

4. A fluid filter as claimed in claim 1 wherein the port of said first valve member is a segmental annular slot.

5. A fluid filter as claimed in claim 4 wherein the port of said second valve member uncovers the opposite end of a filter element not communicating with said annular slot.

References Cited in the file of this patent

UNITED STATES PATENTS

| | | |
|---|---|---|
| 2,173,060 | Andrews | Sept. 12, 1939 |
| 2,429,417 | Magill | Oct. 21, 1947 |